US012172284B2

(12) United States Patent
Machida

(10) Patent No.: US 12,172,284 B2
(45) Date of Patent: Dec. 24, 2024

(54) POWER TOOL HAVING HAMMER MECHANISM

(71) Applicant: MAKITA CORPORATION, Anjo (JP)

(72) Inventor: Yoshitaka Machida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/571,615

(22) Filed: Jan. 10, 2022

(65) Prior Publication Data

US 2022/0241950 A1 Aug. 4, 2022

(30) Foreign Application Priority Data

Feb. 4, 2021 (JP) ................................ 2021-016304

(51) Int. Cl.
*B25D 17/04* (2006.01)
*B25D 17/24* (2006.01)
(Continued)

(52) U.S. Cl.
CPC ........... *B25D 17/043* (2013.01); *B25D 17/24* (2013.01); *B25F 5/006* (2013.01); *B25D 16/00* (2013.01);
(Continued)

(58) Field of Classification Search
CPC ...... B25D 17/043; B25D 17/24; B25D 17/00; B25D 17/04; B25D 2211/061;
(Continued)

(56) References Cited

U.S. PATENT DOCUMENTS 4,371,043 A * 2/1983 Kubokawa ................ F16F 1/12 248/560
4,401,167 A * 8/1983 Sekizawa ............. B25D 17/043 248/573

(Continued)

FOREIGN PATENT DOCUMENTS

DE 10162633 B4 * 12/2012 ............... B25C 1/18
JP H02-185378 A 7/1990

(Continued)

OTHER PUBLICATIONS

May 21, 2024 Office Action issued in Japanese Application No. 2021-016304.

(Continued)

*Primary Examiner* — Robert F Long
*Assistant Examiner* — Eduardo R Ferrero
(74) *Attorney, Agent, or Firm* — Oliff PLC

(57) ABSTRACT

A power tool having a hammer mechanism includes a tool body defining the driving axis, a motor housed in the tool body, an elongate handle connected to the tool body in a cantilever manner and extending in a direction intersecting the driving axis, and at least one biasing member disposed between the tool body and the handle. The motor has a motor shaft that is rotatable around an axis parallel to the driving axis. The handle includes a first end portion connected to the tool body to be pivotable around a pivot axis relative to the tool body, a free end, and a grip part disposed between the first end portion and a free end of the handle. The at least one biasing member is configured to pivotally bias the tool body and the handle such that the grip part and the tool body move away from each other.

12 Claims, 12 Drawing Sheets

(51) Int. Cl.
*B25F 5/00* (2006.01)
*B25D 16/00* (2006.01)
*B25D 17/00* (2006.01)

(52) U.S. Cl.
CPC .............. *B25D 17/00* (2013.01); *B25D 17/04* (2013.01); *B25D 2211/006* (2013.01); *B25D 2211/061* (2013.01); *B25D 2222/57* (2013.01); *B25D 2250/371* (2013.01)

(58) Field of Classification Search
CPC .......... B25D 2211/006; B25D 2222/57; B25D 2250/371; B25D 16/00; B25D 2211/003; B25F 5/006
See application file for complete search history.

(56) References Cited

U.S. PATENT DOCUMENTS 4,530,454 A * 7/1985 Gloor ........................ B25C 1/06 227/129
4,667,749 A * 5/1987 Keller ..................... B25F 5/006 267/140.13
5,025,870 A * 6/1991 Gantner ............... B25D 17/043 173/162.1
5,522,466 A * 6/1996 Harada ................ B25D 17/043 173/162.2
5,697,456 A * 12/1997 Radle ................... B25D 17/043 173/162.2
6,053,388 A * 4/2000 Pfister ....................... B25C 1/14 227/10
6,076,616 A * 6/2000 Kramp ................. B25D 17/043 173/211
6,148,930 A * 11/2000 Berger ................. B25D 17/043 267/137
6,286,610 B1 * 9/2001 Berger .................... B25F 5/006 173/162.1
7,073,698 B2 * 7/2006 Frommelt ................. B25C 1/14 227/10
7,100,706 B2 * 9/2006 Meixner ................. B25F 5/006 173/162.1
7,591,325 B2 * 9/2009 Robieu ................ B25D 17/043 173/210
7,610,967 B2 * 11/2009 Fischer ................... B25F 5/006 173/211
7,614,460 B2 * 11/2009 Henriksson ............ B25D 17/24 173/112
7,669,290 B2 * 3/2010 Oddo ................... B25D 17/043 16/431
7,766,206 B2 * 8/2010 Kurth ...................... B25C 1/184 227/138
7,836,971 B2 * 11/2010 Kikuchi ............... B25D 17/043 16/431
7,886,838 B2 * 2/2011 Hahn ................... B25D 17/043 16/110.1
7,895,909 B2 * 3/2011 Hartmann ............... F16H 21/20 74/25
7,921,935 B2 * 4/2011 Engelfried ........... B25D 17/043 173/162.2
7,987,921 B2 * 8/2011 Hahn ................... B25D 17/043 173/217
8,051,922 B2 * 11/2011 Ohlendorf ............... F16F 15/22 173/210
8,061,438 B2 * 11/2011 Schmid ................ B25D 17/043 173/90
8,225,514 B2 * 7/2012 Guip ................... B27B 17/0033 30/381
8,327,949 B2 * 12/2012 Meixner ................... B25F 5/02 16/431
8,403,076 B2 * 3/2013 Iwakami ................. B25F 5/006 173/210
8,443,912 B2 * 5/2013 Fischer ................... B25F 5/006 173/162.1
8,695,724 B2 * 4/2014 Nakashima ............. B25F 5/006 173/210
8,714,280 B2 * 5/2014 Moreno ............... B25D 17/043 173/210
10,406,668 B2 * 9/2019 Weber ..................... B25F 5/006
11,279,016 B2 * 3/2022 Kurz .................... B25D 17/084
2003/0037937 A1 * 2/2003 Frauhammer ........... B25F 5/006 173/48
2003/0132016 A1 * 7/2003 Meixner .............. B25D 17/043 173/162.2
2003/0160082 A1 * 8/2003 Gunther .................. B25F 5/006 227/10
2004/0177981 A1 * 9/2004 Berger ................. B25D 11/005 173/212
2005/0284646 A1 * 12/2005 Bacila .................. B25D 17/043 173/162.2
2006/0011365 A1 * 1/2006 Stirm ................... B25D 17/043 173/162.2
2006/0086515 A1 * 4/2006 Engelfried ........... B25D 17/043 173/162.1
2006/0185867 A1 * 8/2006 Frauhammer ........ B25D 17/043 173/162.1
2007/0034397 A1 * 2/2007 Fischer ................ B25D 17/043 173/162.2
2007/0039747 A1 * 2/2007 Stirm ................... B25D 11/005 173/202
2007/0107165 A1 * 5/2007 Oddo ...................... B25F 5/006 16/431
2007/0209815 A1 * 9/2007 Iwakami .............. B25D 16/006 173/48
2008/0029282 A1 * 2/2008 Ikuta ..................... F16F 7/1005 30/392
2008/0047720 A1 * 2/2008 Schulz ................. B25D 11/125 173/14
2008/0047724 A1 * 2/2008 Fischer ................ B25D 17/043 173/162.2
2008/0196913 A1 * 8/2008 Bram ................... B25D 17/043 173/162.2
2008/0283261 A1 * 11/2008 Schmid ................ B25D 17/043 173/162.2
2009/0008115 A1 * 1/2009 Guo ..................... B25D 16/003 173/176
2009/0188083 A1 * 7/2009 Hahn ...................... B25F 5/026 173/48
2009/0188688 A1 * 7/2009 Gumpert ................ B25D 17/24 173/104
2009/0218114 A1 * 9/2009 Ohlendorf .............. B23D 51/00 173/211
2009/0308626 A1 * 12/2009 Saur ..................... B25D 16/006 173/160
2010/0000751 A1 * 1/2010 Aoki ...................... B25D 17/24 173/114
2010/0012339 A1 * 1/2010 Hahn ................... B25D 17/043 173/162.1
2010/0025062 A1 * 2/2010 Engelfried ........... B25D 17/043 173/162.2
2010/0163260 A1 * 7/2010 Berger ................. B25D 17/043 173/13
2010/0206594 A1 * 8/2010 Meixner .............. B25D 17/043 173/162.2
2010/0206596 A1 * 8/2010 Kamegai .............. B25D 17/043 16/431
2010/0236800 A1 * 9/2010 Watanabe ............ B25D 17/043 173/162.2
2010/0236801 A1 * 9/2010 Furusawa ............. B25D 11/10 173/162.2
2010/0263893 A1 * 10/2010 Fischer ................ B25D 17/043 173/162.2
2011/0247848 A1 * 10/2011 Sieber .................. B25D 11/125 173/48
2011/0308830 A1 * 12/2011 Furusawa .............. B25F 5/003 173/198
2012/0031639 A1 * 2/2012 Roberts ................ B25D 17/043 173/162.2
2012/0055689 A1 * 3/2012 Wierer ................. B25D 17/043 173/162.2

(56) References Cited

U.S. PATENT DOCUMENTS

2012/0168191 A1* 7/2012 Hecht .................. B25D 16/003 173/104
2013/0199810 A1* 8/2013 Wyler .................. B25D 16/006 173/162.2
2014/0027253 A1* 1/2014 Braun .................... B25D 17/00 200/61.58 R
2014/0352114 A1* 12/2014 Yoshikane ................ B25F 5/02 16/426
2014/0352994 A1* 12/2014 Yoshikane ........... B25D 17/043 173/162.2
2015/0041170 A1* 2/2015 Yoshikane ............. B25D 16/00 173/104
2015/0144366 A1* 5/2015 Machida ................ B25D 16/00 173/104
2015/0144368 A1* 5/2015 Machida ................ B25D 17/24 173/162.2
2015/0202762 A1* 7/2015 Roberts ................ B25D 17/043 173/162.2
2015/0328760 A1* 11/2015 Ikuta .................... B25D 17/043 173/117
2016/0052119 A1* 2/2016 Yamada ................. B25D 17/20 173/117
2016/0207188 A1* 7/2016 Weber .................... B25D 17/24
2016/0361809 A1* 12/2016 Teranishi ............. B25D 17/043
2017/0106517 A1* 4/2017 Machida ................ B25D 16/00
2018/0099392 A1* 4/2018 Sunabe ................ B25D 17/043
2018/0099393 A1* 4/2018 Iida ........................ B25D 17/24
2018/0345469 A1* 12/2018 Tanabe ................. B25D 17/043
2019/0291255 A1* 9/2019 Yoshikane ........... B25D 16/006
2019/0381618 A1* 12/2019 Furusawa ............ B23Q 11/127
2020/0078918 A1* 3/2020 Yoshikane ........... B25D 17/043
2020/0078919 A1* 3/2020 Machida .............. B25D 17/043
2020/0391369 A1* 12/2020 Furusawa .............. B25D 11/12
2021/0039242 A1* 2/2021 Ogura ................ H02K 11/0094

FOREIGN PATENT DOCUMENTS

JP 2014-231126 A 12/2014
JP 2015-100897 A 6/2015
JP 2016-000447 A 1/2016
JP 2017-013173 A 1/2017
JP 2020-156241 A 9/2020

OTHER PUBLICATIONS

Sep. 17, 2024 Office Action issued in Japanese Application No. 2021-016304.

* cited by examiner

POWER TOOL HAVING HAMMER MECHANISM

CROSS-REFERENCE TO RELATED APPLICATION

The present application claims priority to Japanese patent application No. 2021-016304 filed on Feb. 4, 2021, the contents of which are hereby fully incorporated herein by reference.

TECHNICAL FIELD

The present disclosure relates to a power tool having a hammer mechanism that is configured to linearly drive a tool accessory.

BACKGROUND

A power tool having a hammer mechanism, which is configured to linearly drive a tool accessory along a driving axis to perform a processing operation on a workpiece, generates significant vibration especially in an extension direction of the driving axis. In order to cope with the vibration, various vibration-isolating housings are known. For example, Japanese laid-open patent publication No. 2015-100897 discloses a power tool with a hammer mechanism (a rotary hammer) that includes a handle and a body that houses a motor and a driving mechanism. The handle is elastically connected to the body such that the handle is movable in an extension direction of a driving axis relative to the body. The body includes a tubular motor housing part. The handle includes a tubular housing part that is disposed outside the motor housing part. First guide members are disposed on an outer surface of the motor housing part of the body. Second guide members are disposed on an inner surface of the tubular housing part of the handle. The first and second guide members guide relative movement between the body and the handle by sliding relative to each other.

SUMMARY

The above-described vibration-isolating structure can effectively suppress vibration in the extension direction of the driving axis to be transmitted from the body to the handle. However, there is still room for improvement in reducing transmission of vibration to a grip part to be gripped by a user.

Accordingly, it is one, non-limiting object of the present disclosure to provide techniques that can reduce vibration transmission to a grip part in a power tool having a hammer mechanism.

According to one aspect of the present disclosure, a power tool having a hammer mechanism, which is configured to linearly drive a tool accessory along a driving axis, includes a tool body, a motor, a handle and at least one biasing member. The tool body defines the driving axis. The motor is housed in the tool body. The motor has a motor shaft that is rotatable around an axis that is parallel to the driving axis. The handle has an elongate shape. The handle is connected to the tool body in a cantilever manner and extends in a direction that intersects the driving axis. The handle includes a first end portion, a free end, and a grip part. The first end portion is connected to the tool body to be pivotable about a pivot axis relative to the tool body. The grip part is disposed between the first end portion and the free end of the handle. The grip part is configured to be gripped by a user. The at least one biasing member is disposed (interposed) between the tool body and the handle. The at least one biasing member is configured to pivotally bias the tool body and the handle such that the grip part and the tool body move away from each other.

According to the above-described configuration, the handle can pivot relative to the tool body in response to vibration that is generated in driving the tool accessory, and the at least one biasing member can absorb the vibration. Consequently, vibration transmission from the tool body to the handle can be reduced. Further, since the first end portion has the pivot axis, the grip part is movable relative to the tool body by a larger amount, compared to a configuration in which the grip part has a pivot axis. Therefore, the effect of reducing the vibration transmission to the grip part can be enhanced.

DESCRIPTION OF EMBODIMENTS

Figure 1:
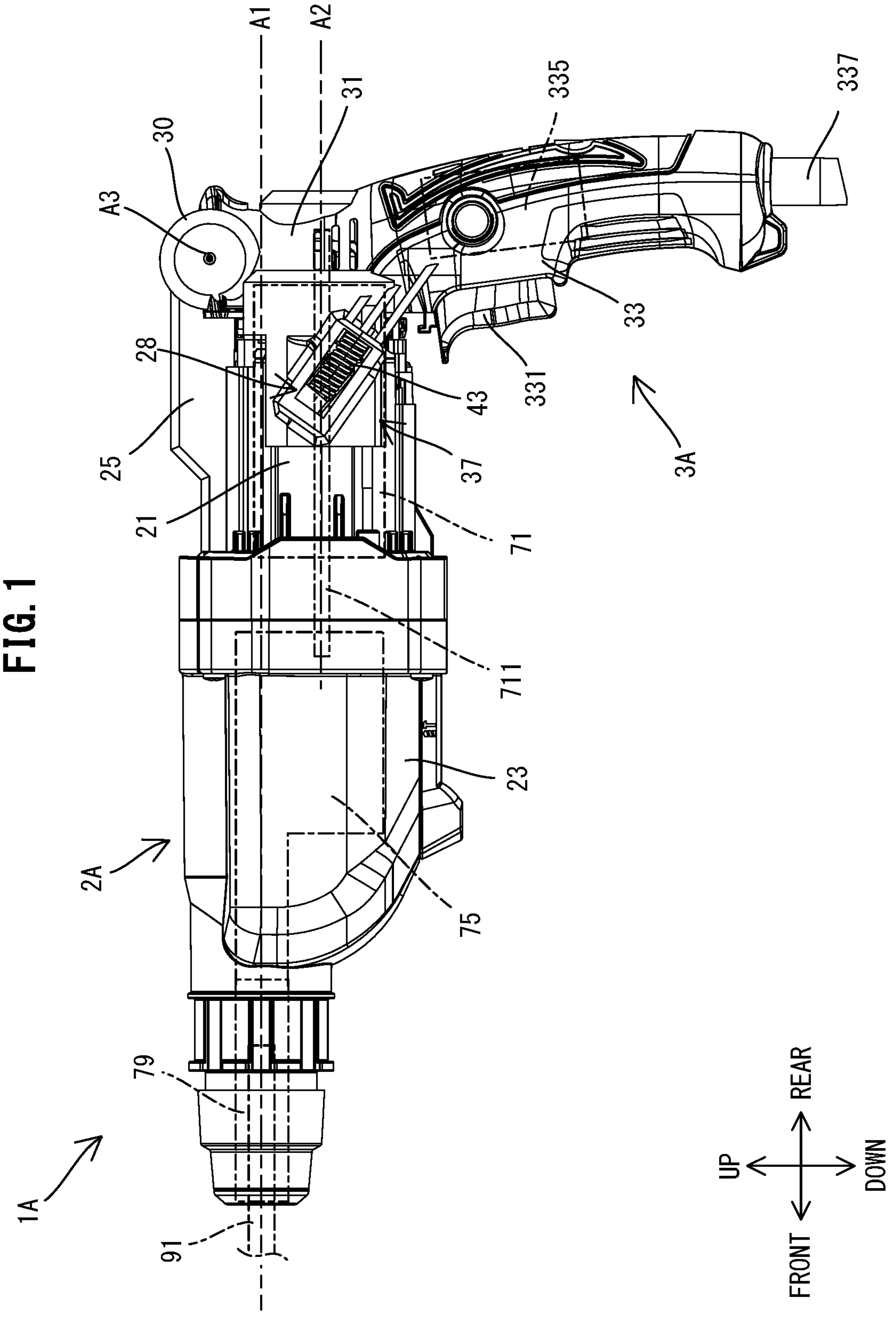
FIG. 1 is a left side view of a rotary hammer according to a first embodiment in a state in which a handle is at (in) an initial position.

In one non-limiting embodiment according to the present disclosure, the driving axis may be located between the pivot axis and the grip part in an extension direction of the handle. This configuration makes it easier for the handle to pivot about the pivot axis relative to the tool body in response to the vibration in the extension direction of the driving axis of the tool body (hereinafter, merely referred to as a driving-axis direction). Therefore, the effect of reducing the vibration transmission can be further enhanced.

In addition or in the alternative to the preceding embodiment, at least a portion of the grip part may be located on a straight line that intersects the pivot axis and that extends in a direction orthogonal to the driving axis. In other words, a straight line that intersects the pivot axis and that extends in a direction orthogonal to the driving axis extends through at least a portion of the grip part. According to this embodiment, the grip part moves in a direction that corresponds to the driving-axis direction in response to relative pivoting movement of the handle. Therefore, transmission of vibration in the driving-axis direction to the grip part can be effectively reduced.

In addition or in the alternative to the preceding embodiments, the position of the pivot axis may be changeable. According to this embodiment, transmission of vibration in various directions can be effectively reduced.

In addition or in the alternative to the preceding embodiments, the tool body and the handle may be connected via at least one elastic member. The at least one elastic member may be disposed around (surround) the pivot axis, and may be disposed (interposed) between the tool body and the first end portion of the handle, such that the tool body and the handle are movable relative to each other in a direction intersecting the pivot axis. In other words, the tool body and the first end portion of the handle may be elastically connected to each other via at least one elastic member. According to this embodiment, transmission of vibration in the direction intersecting the pivot axis can be effectively reduced. The tool body and the handle may be connected via the at least one elastic member such that the tool body and the handle are movable relative to each other also in an extension direction of the pivot axis. According to this configuration, transmission of the vibration in the direction intersecting the pivot axis and in the extension direction of the pivot axis can be effectively reduced without increasing the number of components (parts count).

In addition or in the alternative to the preceding embodiments, the handle may be formed by a first member and a second member connected to each other in an extension direction of the pivot axis. Further, the at least one elastic member may include a first elastic member that is disposed (interposed) between the tool body and the first member, and a second elastic member that is disposed (interposed) between the tool body and the second member. According to this embodiment, two elastic members (the first and second elastic members) can be easily arranged with good balance in the extension direction of the pivot axis.

In addition or in the alternative to the preceding embodiments, the at least one biasing member may be at least one spring. Further, the at least one spring may be arranged such that a biasing direction of the at least one spring substantially coincides with an extension direction of a tangent (tangent line) of a circle centered around the pivot axis. This embodiment achieves arrangement of the at least one spring that is most suitable for the relative pivoting movement between the tool body and the handle.

In addition or in the alternative to the preceding embodiments, the at least one biasing member may include two springs that are arranged in symmetry relative to a plane that contains the driving axis and that extends in an extension direction of the handle. This configuration achieves stabler relative pivoting movement between the tool body and the handle, compared to a configuration including only one spring.

In addition or in the alternative to the preceding embodiments, the at least one biasing member may be at least one torsion coil spring disposed around the pivot axis. According to this embodiment, the at least one torsion coil spring can be held by a relatively simple and compact structure.

Representative, non-limiting embodiments of the present disclosure are now described in detail with reference to the drawings.

First Embodiment

A rotary hammer (also called a hammer drill) 1A according to a first embodiment is described with reference to FIGS. 1 to 7. The rotary hammer 1A is an example of an electric tool that is configured to linearly drive the tool accessory 91 by hammering (striking) a tool accessory 91 (i.e., a power tool having a hammer mechanism). More specifically, the rotary hammer 1A is a power tool that is configured to linearly drive the tool accessory 91 along a driving axis A1 (this operation is hereinafter referred to as a hammering operation) and to rotationally drive the tool accessory 91 around the driving axis A1 (this operation is hereinafter referred to as a rotary operation).

As shown in FIG. 1, an outer shell of the rotary hammer 1A is mainly formed by a tool body 2A and a handle 3A that is connected to the tool body 2A.

The tool body 2A is a hollow body that houses major mechanisms of the rotary hammer 1A. The tool body 2A may also be referred to as a body housing, an outer housing, etc. The tool body 2A extends along the driving axis A1 for the tool accessory 91. A tool holder 79 is disposed in one end portion (a first end portion) of the tool body 2A in an extension direction of the driving axis A1 (hereinafter, merely referred to as a driving-axis direction). The tool accessory 91 is removably held by the tool holder 79. The tool body 2A mainly houses a motor 71 and a driving mechanism 75 that is configured to drive the tool accessory 91 held by the tool holder 79 using power generated by the motor 71. In this embodiment, the motor 71 is arranged such that a rotational axis A2 of a motor shaft 711, which rotates integrally with a rotor, extends in parallel to the driving axis A1.

The handle 3A is an elongate hollow body. The handle 3A is connected to the other end portion (a second end portion) of the tool body 2A in the driving-axis direction (i.e., an end portion opposite to the end portion in which the tool holder 79 is disposed) in a cantilever manner. In other words, only one of two end portions of the handle 3A in its longitudinal direction is connected to the tool body 2A, and the other of the two end portions of the handle 3A defines a free end. Thus, the rotary hammer 1A is a pistol-like handheld tool. The handle 3A protrudes from the second end portion of the tool body 2A and extends in a direction that intersects the driving axis A1 (specifically, a direction that is generally orthogonal to the driving axis A1 and to the rotational axis A2 of the motor shaft 71). The handle 3A has a trigger 331 configured to be manually depressed (pulled) by a user. In the rotary hammer 1A, when the motor 71 is energized in response to depressing manipulation of the trigger 331, the driving mechanism 75 is driven for the hammering operation and/or the rotary operation.

The detailed structure of the rotary hammer 1A is now described. For the sake of convenience, in the following description, the extension direction of the driving axis A1 (the longitudinal direction of the tool body 2A) is defined as a front-rear direction of the rotary hammer 1A. In the front-rear direction, the side on which the tool holder 79 is disposed is defined as a front side of the rotary hammer 1A, while the opposite side (the side on which the handle 3A is located) is defined as a rear side of the rotary hammer 1A. A direction that is orthogonal to the driving axis A1 and that generally corresponds to the extension direction of the handle 3A (a direction that is orthogonal to the driving axis A1 and to the rotational axis A2) is defined as an up-down direction of the rotary hammer 1A. In the up-down direction, the side on which the handle 3A is connected to the tool body 2A is defined as an upper side of the rotary hammer 1A, while the side on which a protruding end (the free end) of the handle 3A is located is defined as a lower side of the rotary hammer 1A. A direction that is orthogonal to the front-rear direction and to the up-down direction is defined as a left-right direction of the rotary hammer 1A.

First, the structure of the tool body 2A and elements (components) disposed within the tool body 2A are described.

As shown in FIGS. 1 to 5, the tool body 2A includes a motor housing part 21, a driving-mechanism housing part 23, an extending part 25 and two first spring holding parts 28.

The motor housing part 21 houses the motor 71. The motor housing part 21 forms a rear half of the tool body 2A. The motor housing part 21 has a tubular shape with a closed rear end.

The driving-mechanism housing part 23 houses the driving mechanism 75. The driving-mechanism housing part 23 forms a front half of the tool body 2A. A front portion of the driving-mechanism housing part 23 has a cylindrical shape. The tool holder 79 is disposed within this cylindrical front portion. The driving mechanism 75 includes a motion converting mechanism and a hammering (striking) mechanism for the hammering operation, and a rotation transmitting mechanism for the rotary operation. The driving mechanism 75 is only briefly described here since the driving mechanism 75 is well-known. The motion converting mechanism typically includes an oscillating mechanism (e.g., a swash bearing, a wobble plate/bearing, etc.) or a crank mechanism, and a piston to convert rotation into linear motion. The rotation transmitting mechanism typically includes a speed reducing mechanism having a train of gears.

In this embodiment, the rotary hammer 1A has three action modes of: (i) a hammer mode (hammering only mode), in which the rotary hammer 1A performs only the hammering operation; (ii) a rotary mode (rotation only mode), in which the rotary hammer 1A performs only the rotary operation; and (iii) a rotary hammer mode (hammering with rotation mode), in which the rotary hammer 1A performs the hammering operation and the rotary operation at the same time. Although not shown or described in detail, the driving mechanism 75 is driven in accordance with the action mode selected by the user via a mode changing nob, in a well-known manner.

The extending part 25 is an elongate portion that extends in the driving-axis direction (i.e., in the front-rear direction) above the motor housing part 21. A rear end portion of the extending part 25 (i.e., an upper rear end portion of the tool body 2A) is elastically connected to the handle 3A (specifically, a second connection part 32) via elastic members 41. Accordingly, in the following description, the rear end portion of the extending part 25 is referred to as a first connecting part 26. The connection between the first connecting part 26 and the second connecting part 26 will be described in detail later.

The two first spring holding parts 28 are disposed on a left rear end portion and a right rear end portion of the motor housing part 21, respectively. Each of the first spring holding parts 28 is configured to receive (abut on) a first end portion 431 among two end portions of a biasing spring 43. In this embodiment, a compression coil spring is employed as the biasing spring 43. The biasing spring 43 is disposed (interposed) between the first spring holding part 28 and the handle 3A (specifically, a spring receiving part 371 of a second spring holding part 37) in a compressed state, so that the biasing spring 43 biases the tool body 2A and the handle 3A away from each other. Thus, the first spring holding part 28 is elastically connected to the handle 3A (specifically, the second spring holding part 37) via the biasing spring 43. The connection between the first spring holding part 28 and the second spring holding part 37 will be described in detail later.

The structure of the handle 3A and elements (components) disposed within the handle 3A are now described.

Figure 4:
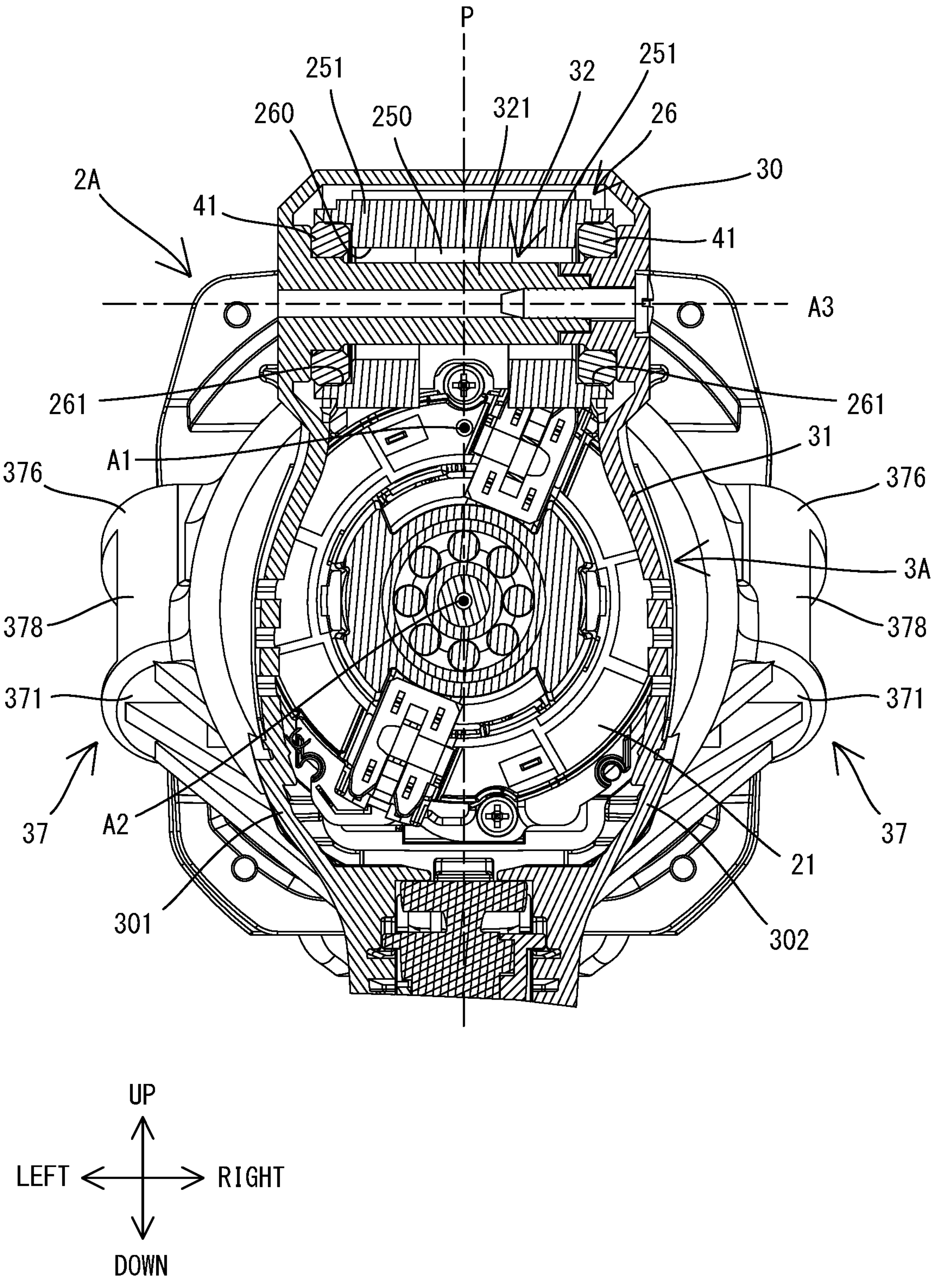
FIG. 4 is a sectional view taken along line IV-IV in FIG. 3.

As shown in FIG. 4, the handle 3A of this embodiment is formed by a left member (a left shell or a left handle part) 301 and a right member (a right shell or a right handle part) 302 that are fixedly connected to each other in the left-right direction, using screws fixed at multiple positions.

As shown in FIGS. 1 to 5, the handle 3A includes a cover part 31, the second connecting part 32, a grip part 33 and the two second spring holding parts 37.

The cover part 31 forms an upper portion of the handle 3A. The cover part 31 is configured to cover a rear end portion of the tool body 2A (specifically, the rear end portion of the motor housing part 21 and the first connecting part 26). More specifically, the cover part 31 includes a left wall part, a right wall part, a rear wall part and an upper wall part that are respectively arranged leftward of, rightward of, rearward of and above the rear end portion of the tool body 2A.

The second connecting part 32 is provided in an upper end portion of the cover part 31 (i.e., in an upper end portion 30 of the handle 3A). The second connecting part 32 is connected to the first connecting part 26 of the tool body 2A via the elastic members 41. The detailed structure of the second connecting part 32 and the connection between the first connecting part 26 and the second connecting part 32 will be described in detail later.

The grip part 33 is a portion to be gripped by the user. The grip part 33 extends downward from the cover part 31. Thus, the grip part 33 extends in the up-down direction below a lower end of the tool body 2A. The grip part 33 is an elongate tubular portion. The trigger 331 is disposed on an upper end portion of the grip part 33. A switch 335 is disposed behind the trigger 331 within the grip part 33. The switch 335 is normally kept OFF and is turned ON in response to depressing manipulation of the trigger 331. When the switch 335 is turned ON, the motor 71 is energized. A power cord 337, which is connectable to the external AC power source, extends from a lower end of the grip part 33 (the free end or the protruding end of the handle 3A).

The two second spring holding parts 37 are disposed in association with the left and right first spring holding parts 28 of the tool body 2A, respectively. Each of the second spring holding parts 37 is configured to receive (abut on) a second end portion 432 of the biasing spring 43. The connection between the first spring holding part 28 and the second spring holding part 37 will be described in detail later.

The details of the structure for connecting the tool body 2A and the handle 3A are now described in detail.

First, the details of the structure for connecting the first connecting part 26 and the second connecting part 32 are described.

Figure 2:
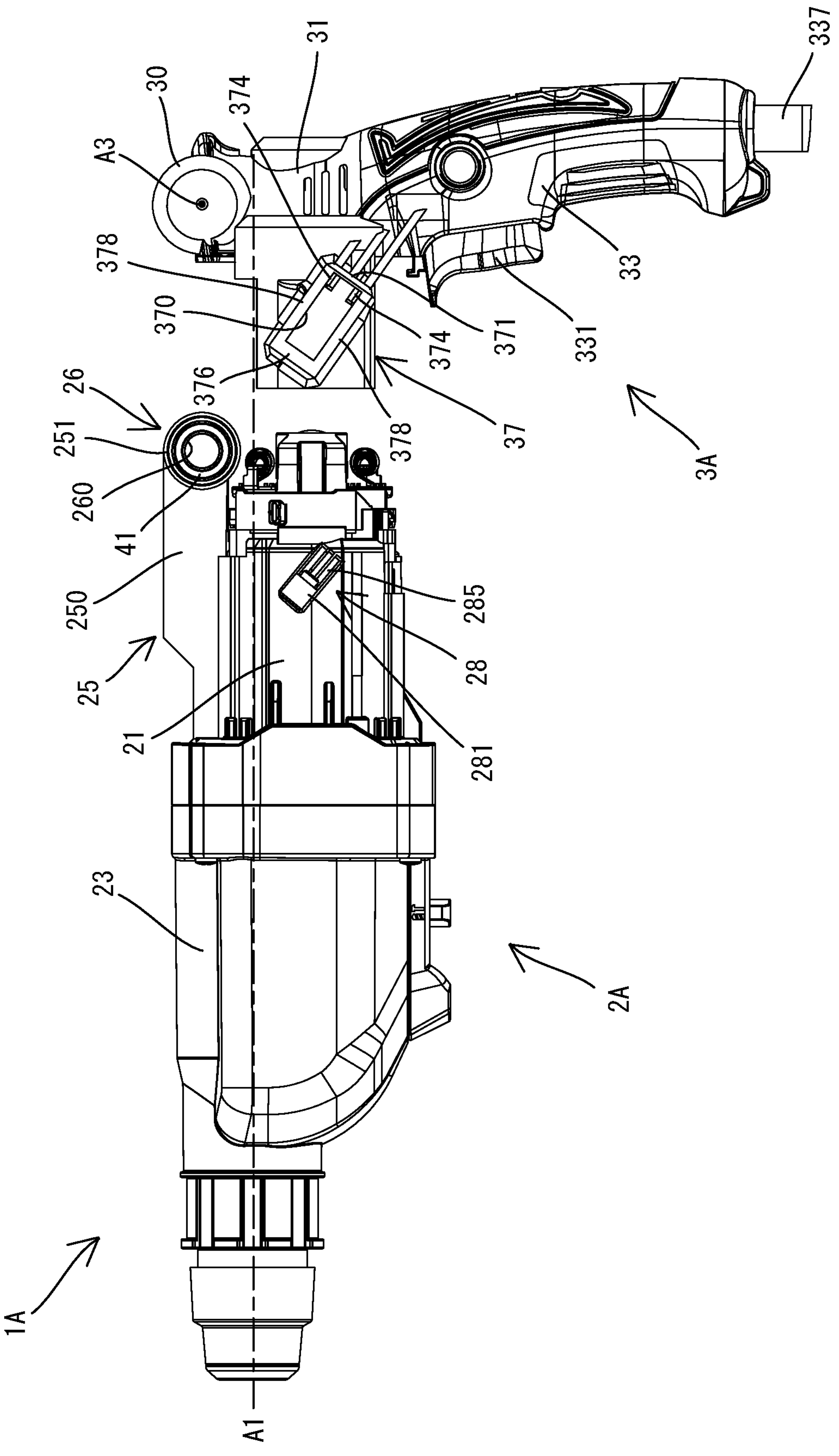
FIG. 2 is an exploded view of a tool body and a handle.

As shown in FIGS. 2 and 4, the extending part 25 of the tool body 2A includes a plate part 250 and two disc parts 251. The plate part 250 is shaped like an elongate rectangular plate and extends linearly in the front-rear direction. The two disc parts 251 protrude leftward and rightward from a rear end portion of the plate part 250, respectively. The first connecting part 26 is formed by the two disc parts 251 and a portion of the plate part 250 (the rear end portion of the plate part 250) between the two disc parts 251.

The first connecting part 26 has a support hole 260. The support hole 260 is an opening that has a circular sectional shape and that penetrates the first connecting part 26 in the left-right direction. The support hole 260 penetrates central portions of the disc parts 251. An annular recess 261 is formed on a side surface of each of the disc parts 251. The annular recess 261 surrounds (encircles) the support hole 260. The elastic members (elastic rings) 41, each having an annular (ring, loop) shape, are fitted in the recesses 261, respectively. In this embodiment, the elastic members 41 are each made of silicone rubber.

As shown in FIG. 4, the second connecting part 32 of the handle 3A includes a connecting shaft 321. As described above, the handle 3A is formed by the left member 301 and the right member 302 connected to each other. The connecting shaft 321 is formed by a first portion provided on the left member 301 and a second portion provided on the right member 302. The first portion and the second portion are fixed to each other via a screw to form the connecting shaft 321. The connecting shaft 321 extends in the left-right direction between the left wall part and the right wall part of the cover part 31 within the upper end portion 30 of the handle 3A.

The diameter of the connecting shaft 321 is smaller than the diameter of the support hole 260 of the first connecting part 26. The connecting shaft 321 is inserted into the support hole 260 and supported by the two elastic members 41. One of the two elastic members 41 is disposed (interposed) between a left end portion of the connecting shaft 321 (the first portion on the left member 301) and the first connecting part 26 in a radial direction of the connecting shaft 321. The other one of the two elastic members 41 is disposed (interposed) between a right end portion of the connecting shaft 321 (the second portion on the right member 302) and the first connecting part 26 in the radial direction of the connecting shaft 321. The two elastic members 41 thus hold the connecting shaft 321 and the first connecting part 26 to be spaced apart from each other in the radial direction of the connecting shaft 321.

Further, one of the elastic members 41 is disposed (interposed) between the left wall part of the cover part 31 (the left member 301) and the first connecting part 26 (the disc part 251) in an axial direction of the connecting shaft 321 (i.e., in the left-right direction). The other one of the elastic members 41 is disposed (interposed) between the right wall part of the cover part 31 (the right member 302) and the first connecting part 26 (the disc part 251) in the left-right direction. The left elastic member 41 thus holds the left member 301 and the first connecting part 26 to be spaced apart from each other in the left-right direction. The right elastic member 41 thus holds the right member 302 and the first connecting part 26 to be spaced apart from each other in the left-right direction.

Owing to the above-described connecting structure, the connecting shaft 321 (the handle 3A) is pivotable about a pivot axis A3, which is an axis of the connecting shaft 321, relative to the first connecting part 26 (the tool body 2A). Further, the connecting shaft 321 (the handle 3A) is movable in a direction that intersects the pivot axis A3 and also in an extension direction of the pivot axis A3 (i.e. in the left-right direction) relative to the first connecting part 26 (the tool body 2A), in response to elastic deformation of the elastic members 41. In other words, in this embodiment, the position of the pivot axis A3 relative to the tool body 2A (and to the driving axis A1) is changeable in response to the elastic deformation of the elastic members 41. In this embodiment, although it is consistently described that "the pivot axis A3 extends in the left-right direction", this description may include a case where the pivot axis A3 extends in a direction that is slightly shifted from the left-right direction (i.e. in a direction intersecting the left-right direction at a small angle).

The structure for connecting the first spring holding parts 28 and the second spring holding parts 37 is now described.

Figure 5:
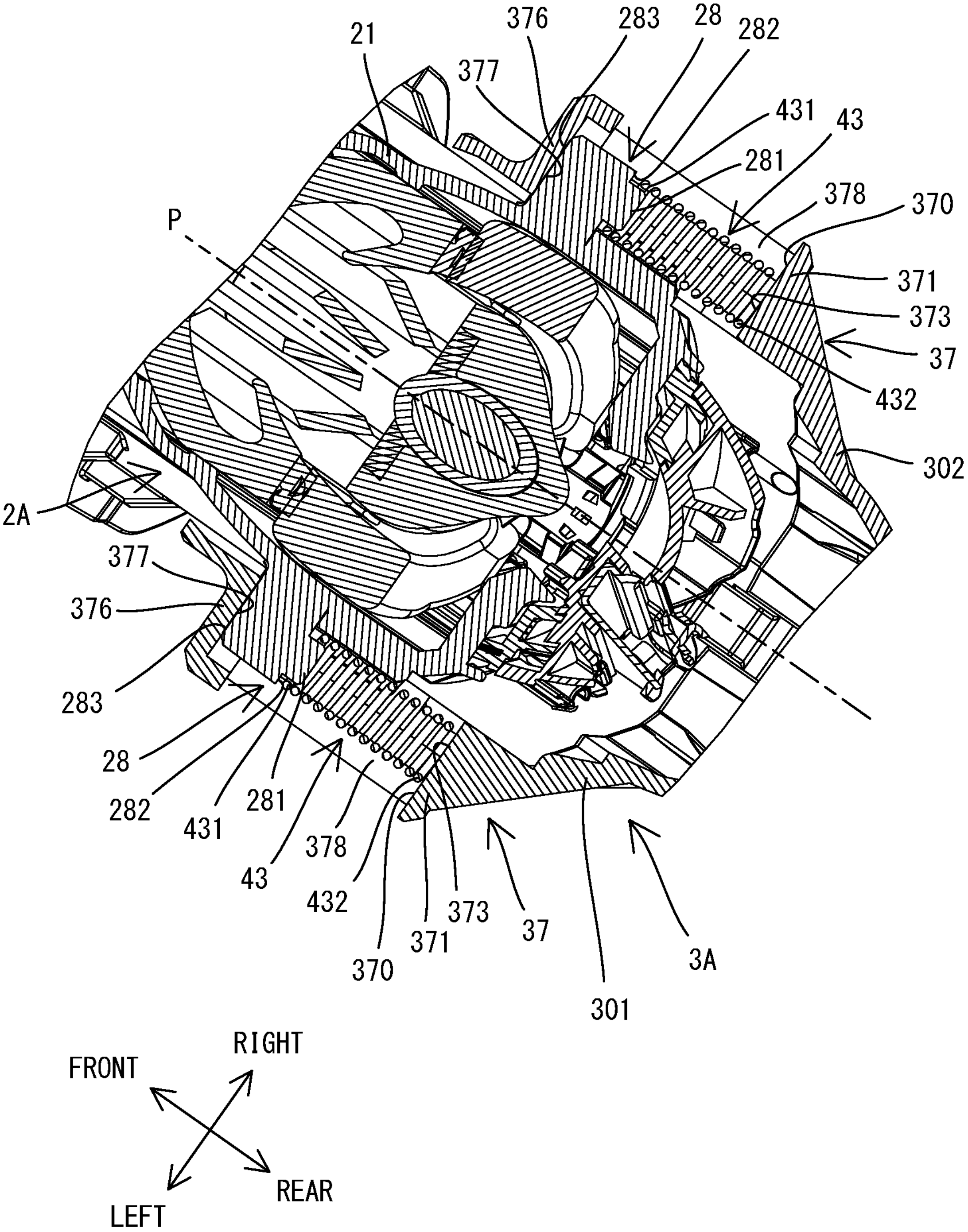
FIG. 5 is a sectional view taken along line V-V in FIG. 3.

As shown in FIGS. 2 and 5, the two first spring holding parts 28 of the tool body 2A are arranged in symmetry relative to an imaginary plane P that passes the center in the left-right direction (i.e., the extension direction of the pivot axis A3) of the rotary hammer 1A (the tool body 2A) and that extends in the up-down direction (i.e., the substantial extension direction of the handle 3A). Note that the plane P is also an imaginary plane that contains the driving axis A1 and that extends in the up-down direction (or an imaginary plane that contains the driving axis A1 and the rotational axis A2). Each of the first spring holding parts 28 includes a spring receiving part (spring seat) 281 and a spring guide 285.

The spring receiving part 281 is shaped like a stepped solid cylinder including a small-diameter portion and a large-diameter portion. The spring receiving part 281 is fixed on the outer surface of the motor housing part 21. The spring receiving part 281 is located below and frontward of the first connecting part 26. A center axis of the spring receiving part 281 is inclined (extends obliquely) with respect to the driving axis A1 and the rotational axis A2 of the motor shaft 711 in a side view. More specifically, the center axis of the spring receiving part 281 is inclined downward toward the rear. The spring receiving part 281 is arranged such that the small-diameter portion is on an obliquely lower rear side of the large-diameter portion. The first end portion 431 of the biasing spring 43, which is a compression coil spring, is fitted around the small-diameter portion of the spring receiving part 281 and abuts on (is in contact with) a contact surface 282 of a shoulder portion (i.e., a stepped portion between the small-diameter portion and the large-diameter portion) of the spring receiving part 281.

The spring guide 285 is disposed adjacent to the small-diameter portion of the spring receiving part 281 and extends obliquely downward and rearward. The spring guide 285 has a curved surface that conforms to an outer peripheral shape of the biasing spring 43. The spring guide 285 guides the biasing spring 43 during extension/contraction of the biasing spring 43, while restricting movement of the biasing spring 43 in a direction that intersects an axis of the biasing spring 43.

As shown in FIGS. 2 to 5, the two second spring holding parts 37 of the handle 3A are wall parts that protrude forward from a left side portion and a right side portion of the cover part 31, respectively. The two second spring holding parts 37 are configured to cover the left and right first spring holding parts 28 of the tool body 2A from the left and the right, respectively. Thus, the second spring holding parts 37 are also arranged in substantially symmetry relative to the plane P, corresponding to the first spring holding parts 28. A portion of each of the second spring holding parts 37 that is opposed (faces) the first spring holding part 28 has a rectangular opening 370. The opening 370 is arranged such that its long sides are inclined downward toward the rear in its side view. The first spring holding part 28 and the biasing spring 43 are arranged in the opening 370. Specifically, the spring receiving part 281 of the first spring holding part 28 is arranged in an upper front portion of the opening 370. The opening 370 is surrounded (defined) by the spring receiving part (spring seat) 371, a stopper 376, and two restricting parts 378.

The spring receiving part 371 is a wall part that defines a short side of the opening 370 at the lower rear side. The spring receiving part 371 is located below and rearward of the spring receiving part 281 of the first spring holding part 28. The spring receiving part 371 has a contact surface 373 that abuts on (is in contact with) the second end portion 432 of the biasing spring 43. The contact surface 373 is substantially opposed to (faces) the contact surface 282 of the spring receiving part 281 of the first spring holding part 28. Two engagement pieces 374 protrude from the spring receiving part 371. The second end portion 432 of the biasing spring 43 is fitted between and held by the two engagement pieces 374.

The stopper 376 is a wall part that defines a short side of the opening 370 at the upper front side. The stopper 376 has a stopper surface 377 that is configured to selectively abut on (come into contact) an end surface 283 of the spring receiving part 281 (the large-diameter portion). The stopper surface 377 of the stopper 376 extends generally in parallel to the contact surface 373 of the spring receiving part 371.

The two restricting parts 378 are wall parts that define two long sides of the opening 370. The restricting part 378 prevents an intermediate portion of the biasing spring 43 from being excessively bent when the tool body 2A and the handle 3A pivot relative to each other.

The biasing spring (the compression coil spring) 43 is compressed and held between the spring receiving part 281 (the contact surface 282) of the tool body 2A (the first spring holding part 28) and the spring receiving part 371 (the contact surface 373) of the handle 3A (the second spring holding part 37). The biasing spring 43 thus pivotally biases the tool body 2A and the handle 3A. More specifically, the biasing spring 43 biases the handle 3A relative to the tool body 2A such that the grip part 33 pivots away from the tool body 2A (in a direction of an arrow (in a counterclockwise direction) in FIG. 3, hereinafter referred to as a first direction). The first direction is also a direction in which the free end of the handle 3A moves rearward relative to the tool body 2A or a direction in which an angle between the tool body 2A and the grip part 33 (an angle between the driving axis A1 and a longitudinal axis of the handle 3A) becomes larger.

In an initial state, the handle 3A is held at (in) a position where the stopper surfaces 377 of the stoppers 376 respectively abut on (are in contact with) the end surfaces 283 of the spring receiving parts 281 (a position shown in FIGS. 3 and 5), owing to the biasing force of the biasing springs 43. In the initial state, no external force acts to pivot the handle 3A in an opposite direction (i.e., in a direction in which the grip part 33 moves closer to the tool body 2A, hereinafter referred to as a second direction) relative to the tool body 2A against the biasing force of the biasing springs 43. The second direction is also a direction in which the free end of the handle 3A moves frontward relative to the tool body 2A or a direction in which the angle between the tool body 2A and the grip part 33 becomes smaller. The position of the handle 3A relative to the tool body 2A in the initial state is hereinafter referred to as an initial position of the handle 3A.

Figure 3:
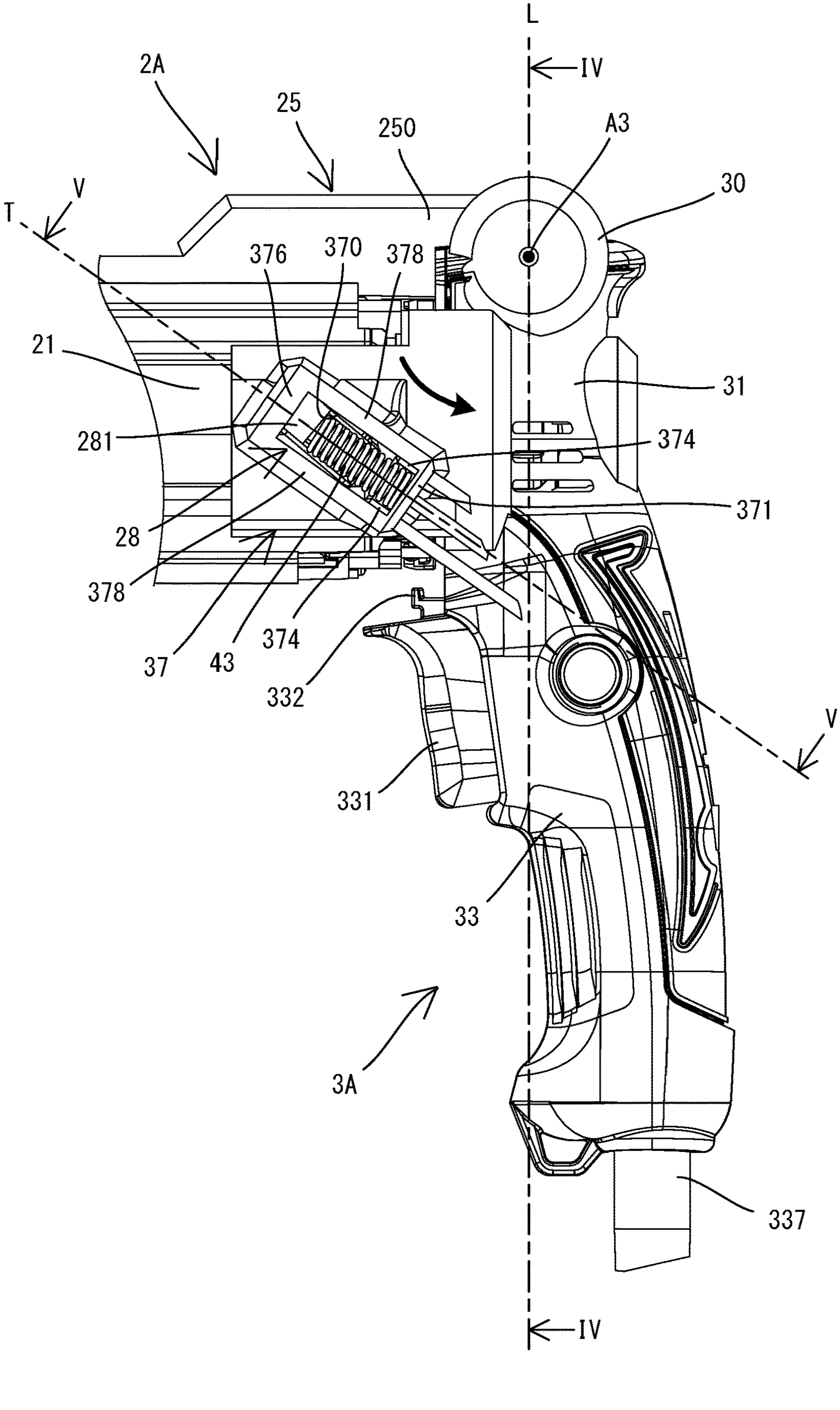
FIG. 3 is a partial, enlarged view of FIG. 1.

As shown in FIG. 3, each of the biasing springs 43 is arranged such that its axial line substantially coincides with an extension direction of a tangent (tangent line) T of a circle centered around the pivot axis A3 of the handle 3A when the handle 3A is at (in) the initial position. In other words, a biasing direction or an extension/contraction direction of each biasing spring 43 substantially coincides with a pivoting direction of the handle 3A relative to the tool body 2A when the handle 3A is at (in) the initial position. Further, when the rotary hammer 1A is viewed from the left or the right, the upper end portion of the grip part 33 (the portion on which the trigger 331 is disposed) is located on (intersected by, overlaps) an imaginary straight line L that intersects the pivot axis A3 and that extends in the up-down direction. More specifically, the straight line L is substantially orthogonal to the driving axis A1, the rotational axis A2 and the pivot axis A3.

Figure 6:
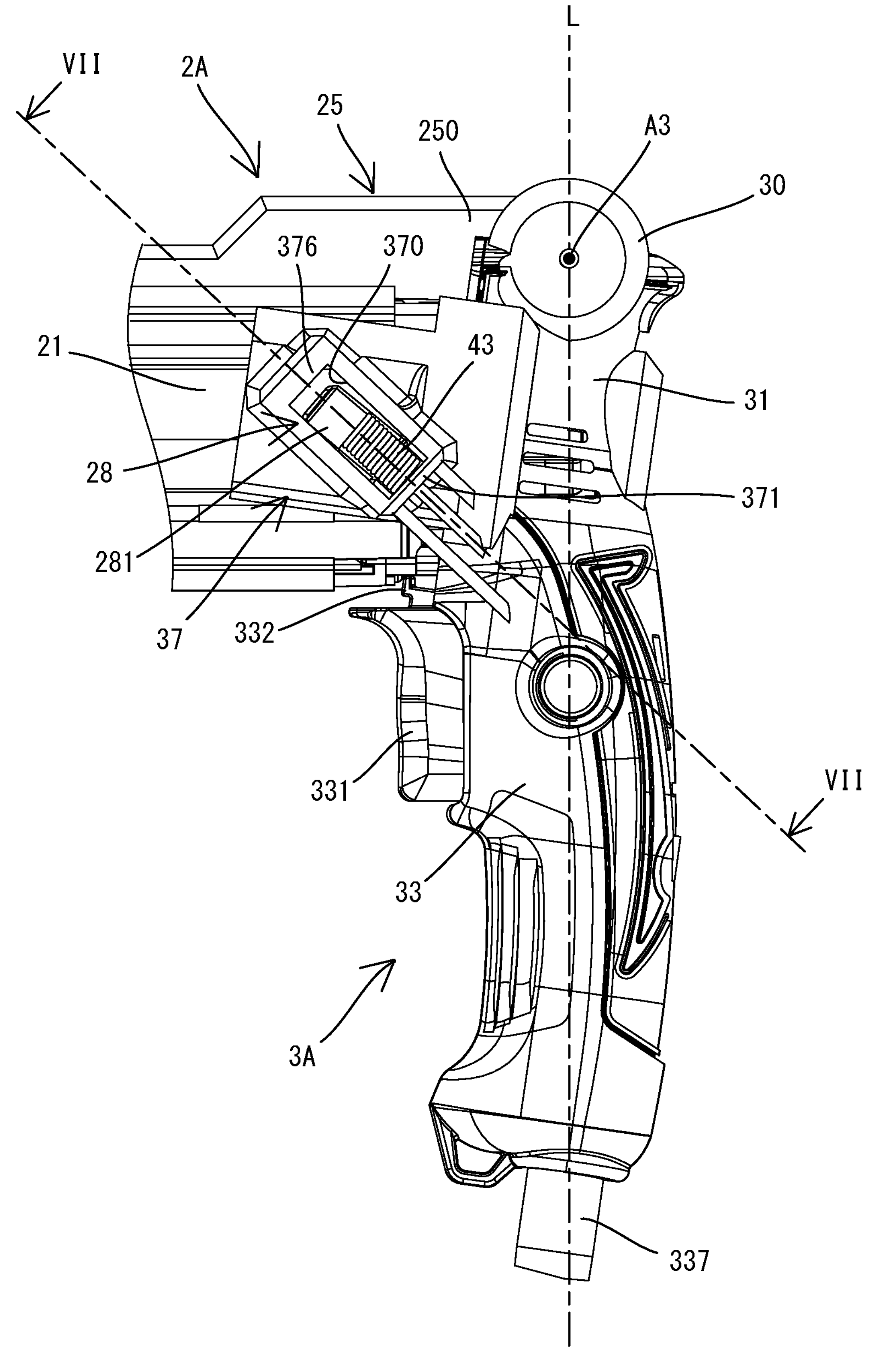
FIG. 6 is a partial left side view of the rotary hammer in a state in which the handle is at (in) a forward position.
Figure 7:
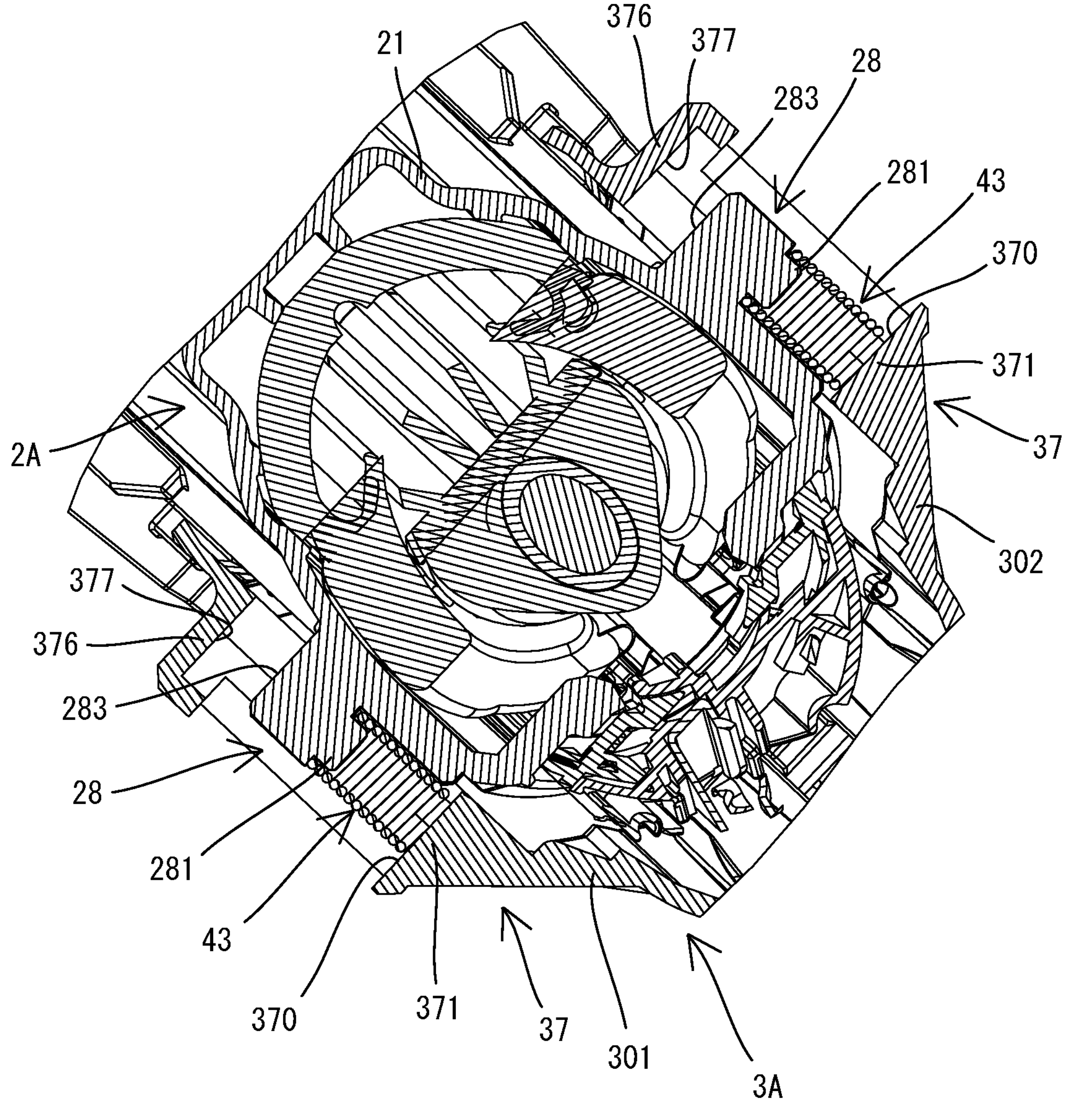
FIG. 7 is a sectional view taken along line in FIG. 6.

As shown in FIGS. 6 and 7, when the external force is applied, the handle 3A pivots in the second direction relative to the tool body 2A while compressing the biasing springs 43 (against the biasing force of the biasing springs 43). In this embodiment, a stopper 332 protrudes upward from an upper end of the trigger 331. When the handle 3A is at the initial position (the position shown in FIG. 3), the stopper 332 is spaced apart downward from a lower end portion of the tool body 2A (specifically, the motor housing part 21). The handle 3A is pivotable in the second direction relative to the tool body 2A from the initial position to a position where the stopper 332 contacts (abuts) the lower end portion of the tool body 2A (a position shown in FIG. 6, hereinafter referred to as a forward position). It is noted that also the upper end portion of the grip part 33 is located on the straight line L when the handle 3A is at the forward position and viewed from the left or the right.

The actions of the tool body 2A and the handle 3A during the hammering operation are now described.

When the driving mechanism 75 is driven for the hammering operation, the tool accessory 91 is driven along the driving axis A1. Consequently, largest vibration is generated on the tool body 2A in the driving-axis direction (i.e., in the front-rear direction). In response to the vibration, the handle 3A pivots in a range between the initial position and the forward position relative to the tool body 2A while being subjected to the biasing force in the first direction. The grip part 33 thus moves generally in the front-rear direction relative to the tool body 2A. Further, the biasing springs 43 each absorb the vibration by extending/contracting in response to the pivoting movement of the handle 3A relative to the tool body 2A. Owing to such actions, the transmission of the vibration in the driving-axis direction from the tool body 2A to the handle 3A can be effectively reduced. In particular, each of the biasing springs 43 is arranged such that its axial line extends along the pivoting direction of the handle 3A relative to the tool body 2A. The biasing springs 43 are thus disposed at optimal positions. Further, the two biasing springs 43 are arranged in symmetry relative to the plane P in the extension direction of the pivot axis A3 (i.e. in the left-right direction), and thus the tool body 2A and the handle 3A can stably pivot relative to each other.

In the rotary hammer 1A, the pivot axis A3 of the handle 3A is located in (intersects, extends through) the upper end portion 30 of the handle 3A that is spaced upward from the grip part 33. This configuration can increase an amount of the movement of the grip part 33 in the front-rear direction relative to the tool body 2A, compared to a configuration having the pivot axis A3 located in the grip part 33. Consequently, the effect of reducing the transmission of vibration in the front-rear direction to the grip part 33 can be enhanced. Further, some known power tools having a hammer mechanism include a tool body with a tubular rear end portion and a handle with a tubular upper end portion. In these known power tools, the tubular upper end portion of the handle is disposed around and elastically connected to the rear end portion of the tool body such that these portions are slidable relative to each other in the driving-axis direction (i.e., in the front-rear direction). In these known power tools, the vibration-isolating effect on the grip part, which is located below the tubular upper end portion of the handle, may be slightly lower, compared to the vibration-isolating effect on the tubular upper end portion of the handle. On the contrary, the configuration of this embodiment can reliably enhance the vibration-isolating effect on the grip part 33, compared to the vibration-isolating effect on the cover part 31 (the upper end portion 30) of the handle 3A.

Further, the driving axis A1 is between the pivot axis A3 of the handle 3A and the grip part 33 in the extension direction of the handle 3A. This configuration can make it easier for the handle 3A to pivot relative to the tool body 2A in response to the vibration in the front-rear direction of the tool body 2A, compared to a configuration in which the driving axis A1 is above the pivot axis A3. Thus, the effect of reducing transmission of the vibration in the front-rear direction can be improved.

Further, the upper end portion of the grip part (the portion corresponding to the trigger 331) is located on the straight line L that intersects the pivot axis A3 and extends in the up-down direction. Owing to this configuration, the moving direction of the grip part 33 during the pivoting movement of the handle 3A generally corresponds to the front-rear direction. Thus, the effect of reducing transmission of the vibration in the front-rear direction can be improved.

Further, in the rotary hammer 1A, the elastic members 41, which are each disposed around the pivot axis A3 (the connecting shaft 321), allow the relative movement between the tool body 2A and the handle 3A in all directions that intersect the pivot axis A3 in response to the elastic deformation. Further, the elastic members 41 each allow the relative movement between the tool body 2A and the handle 3A also in the extension direction of the pivot axis A3 (i.e., in the left-right direction) in response to the elastic deformation. Thus, in this embodiment, the tool body 2A and the handle 3A are not only pivotable around the pivot axis A3, but also movable in the front-rear direction relative to each other owing to the elastic members 41. Thus, the transmission of the largest vibration in the front-rear direction can be further effectively reduced. Although not as large as the vibration in the front-rear direction, vibration is also generated on the tool body 2A in other direction(s) (e.g., in the up-down direction and/or in the left-right direction). The connecting structure using the elastic members 41 in this embodiment can also appropriately cope with the vibration in all the other directions, utilizing the elastic deformation of the elastic members 41.

Further, in this embodiment, the two elastic members 41 are respectively arranged between the tool body 2A and the left member 301 of the handle 3A and between the tool body 2A and the right member 302 of the handle 3A. This configuration can allow the two elastic members 41 to be mounted easily with good balance in the left-right direction when the tool body 2A and the handle 3A (the left member 301 and the right member 302) are connected to each other. Further, this configuration achieves stable relative movement between the tool body 2A and the handle 3A.

Second Embodiment

A rotary hammer 1B according to a second embodiment is now described with reference to FIGS. 8 to 12. The rotary hammer 1B in the second embodiment includes the same structures as those of the rotary hammer 1A (see FIG. 1) in the first embodiment. Thus, in the following description, structures that are substantially identical to those of the first embodiment (including structures having slightly different shapes) are given the same numerals and the illustrations and the descriptions thereof are omitted or simplified, and different structures are mainly described.

Figure 8:
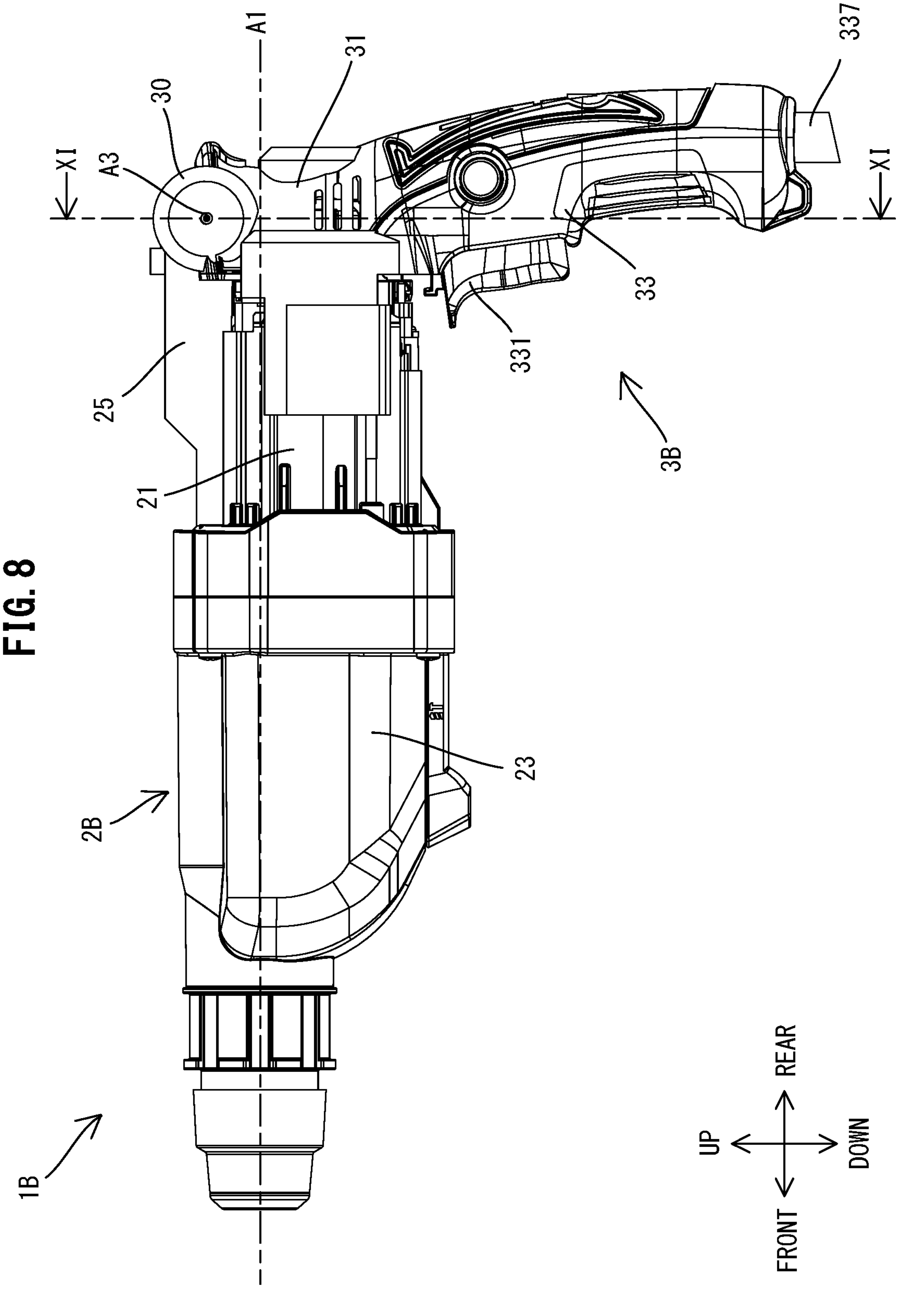
FIG. 8 is a left side view of a rotary hammer according to a second embodiment in a state in which a handle is at (in) an initial position.

As shown in FIG. 8, similarly to the rotary hammer 1A in the first embodiment, the rotary hammer 1B in the second embodiment includes a tool body 2B and a handle 3B that is elastically connected to the tool body 2B. However, the structure for connecting the tool body 2B and the handle 3B is different from that in the first embodiment, as will be described in detail later.

The tool body 2B includes the motor housing part 21 that houses the motor 71, the driving-mechanism housing part 23 that houses the driving mechanism 75, and the elongate extending part 25 that extends in the front-rear direction above the motor housing part 21. The rear end portion of the extending part 25 is configured as the first connecting part 26 (see FIG. 11).

Figure 9:
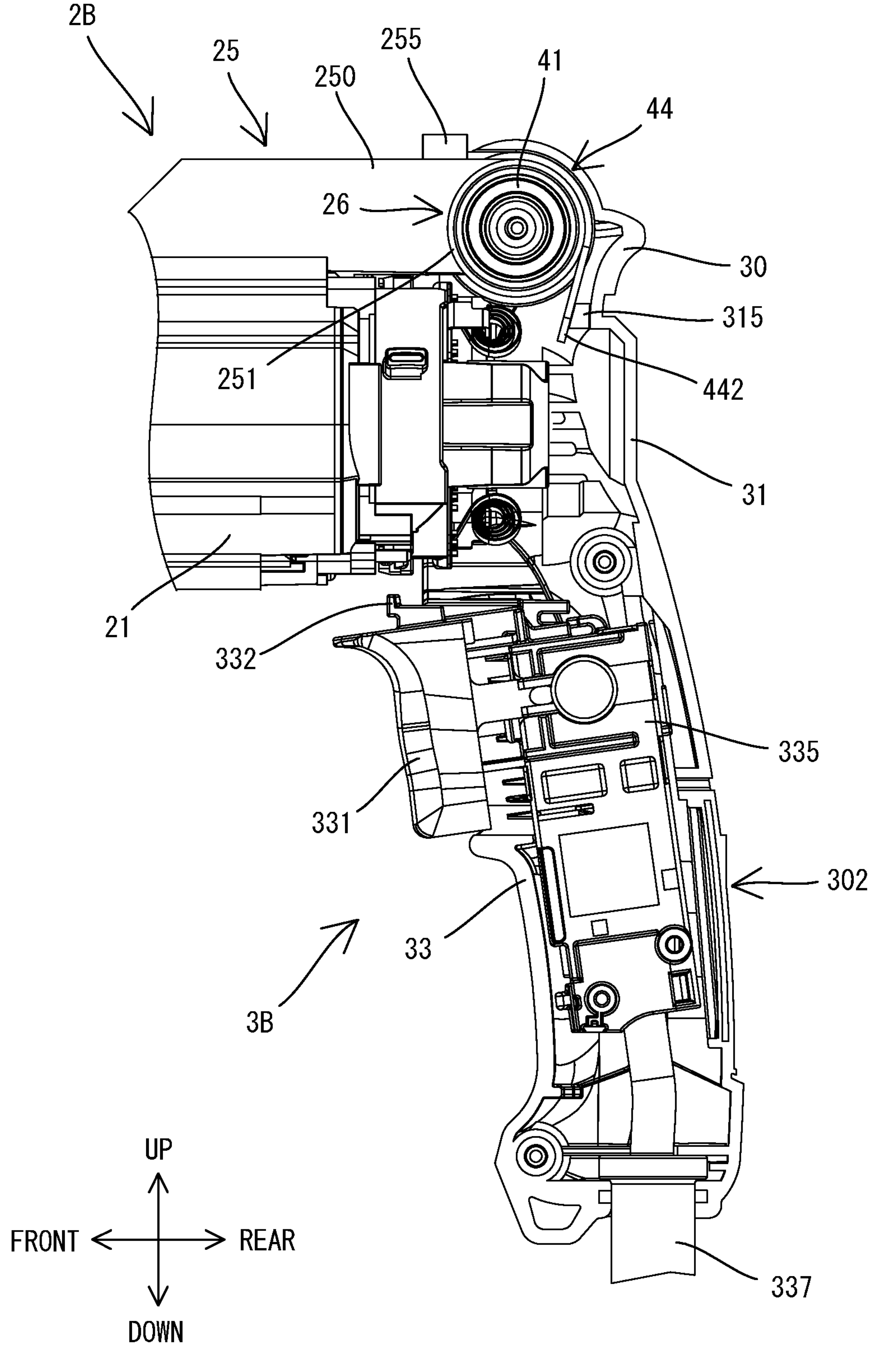
FIG. 9 is a partial left side view of the rotary hammer in a state in which a left member of the handle is removed and the handle is at the initial position.
Figure 10:
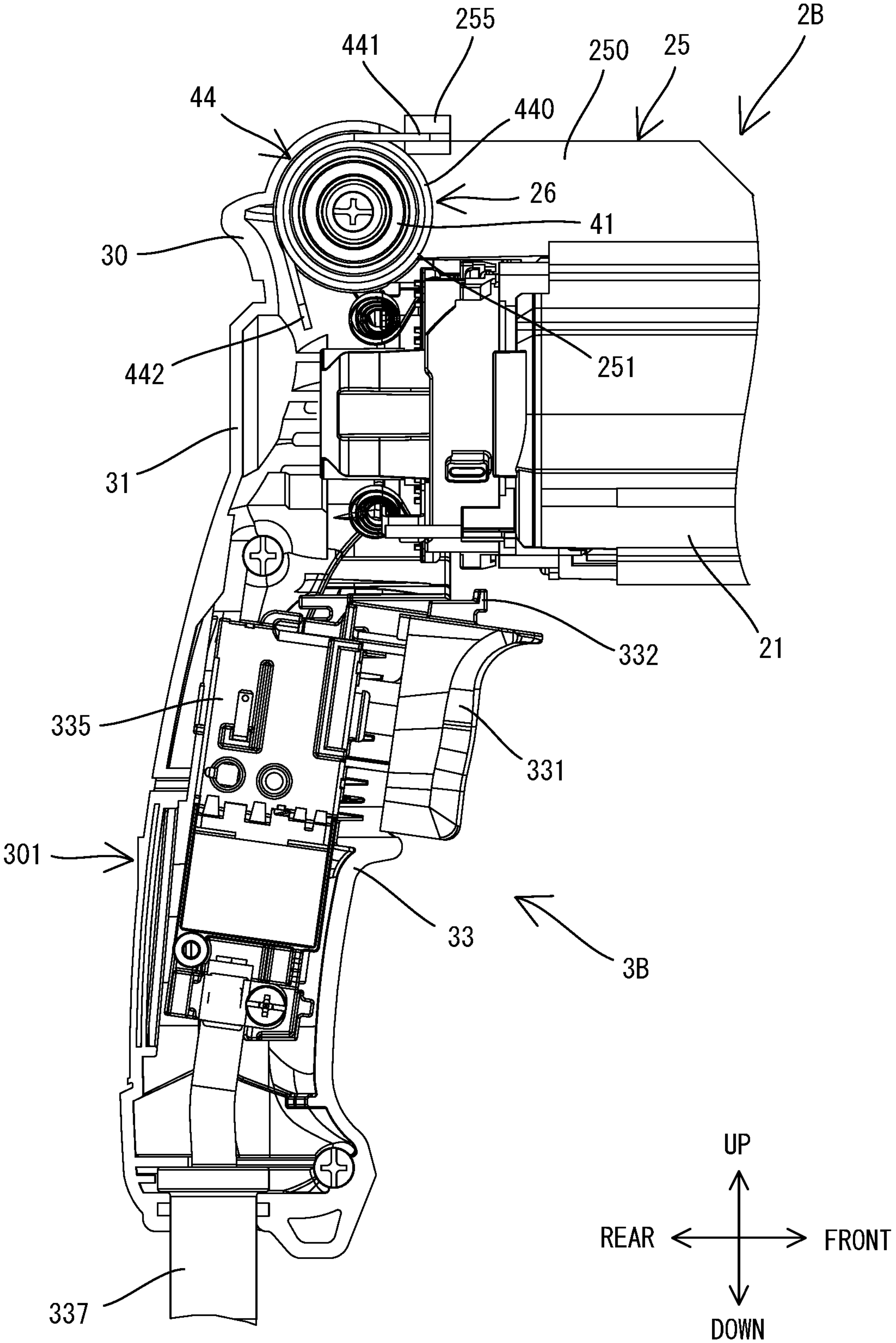
FIG. 10 is a partial right side view of the rotary hammer in a state in which a right member of the handle is removed and the handle is at the initial position.
Figure 11:
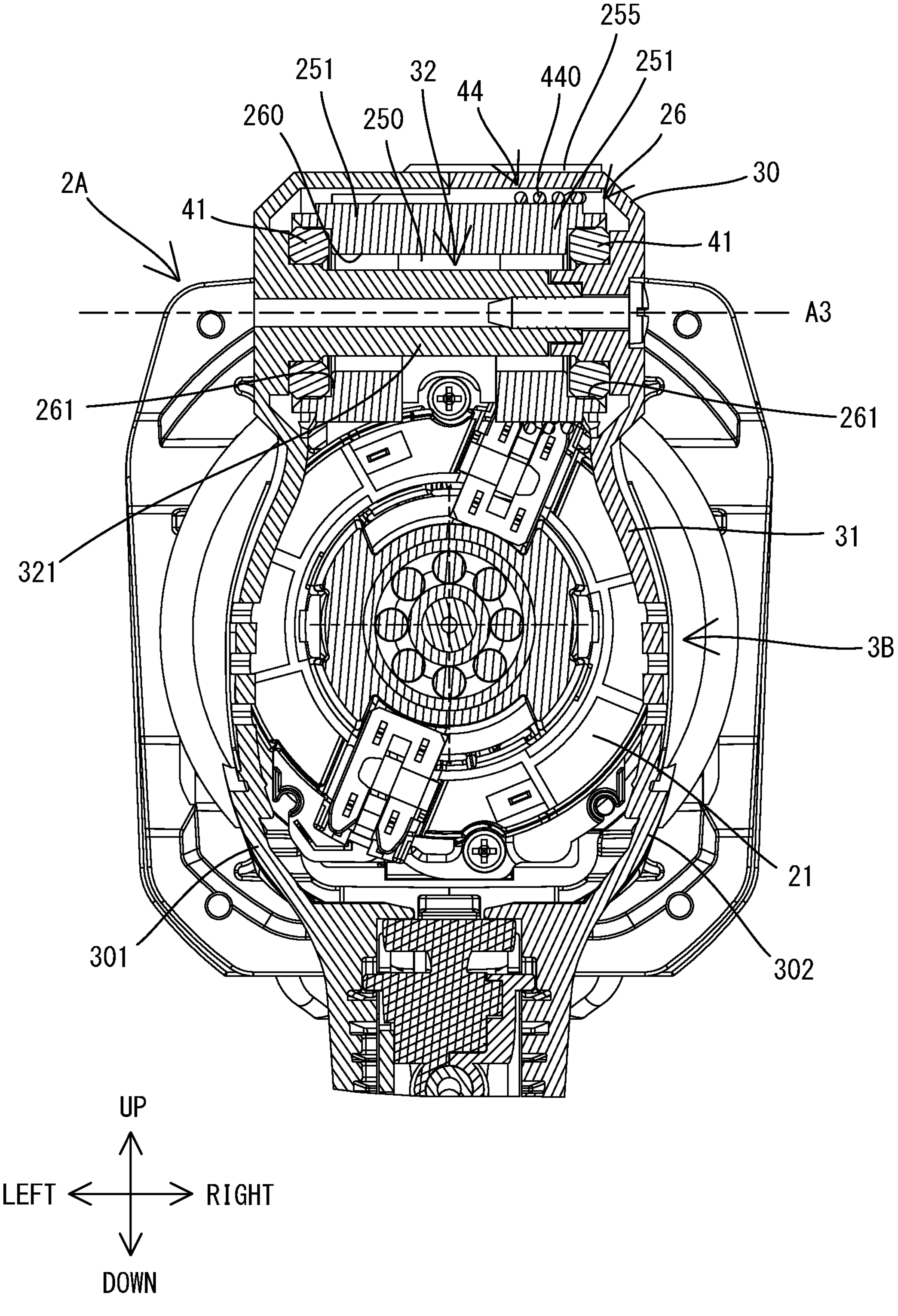
FIG. 11 is a sectional view taken along line XI-XI in FIG. 8.

As shown in FIGS. 9 to 11, similarly to the first embodiment, the handle 3B is formed by the left member (the left shell) 301 and the right member (the right shell) 302 that are fixedly connected to each other in the left-right direction by screws (not shown). The handle 3B includes the cover part 31 that covers the rear end portion of the tool body 2B, the second connecting part 32 that is elastically connected to the first connecting part 26, and the grip part 33 that has the trigger 331.

The structure for connecting the tool body 2B and the handle 3B is now described in detail.

As shown in FIG. 11, similarly to the first embodiment, the first connecting part 26 of the tool body 2B and the second connecting part 32 of the handle 3B of this embodiment are connected to each other via the two elastic members 41. Specifically, the elastic members 41 are each disposed (interposed) between the connecting shaft 321 and the first connecting part 26 in the radial direction of the connecting shaft 321. Further, the elastic members 41 are disposed (interposed) between the left member 301 and the first connecting part 26 and between the right member 302 and the first connecting part 26, respectively, in the axial direction of the connecting shaft 321 (i.e., in the left-right direction).

Owing to this connecting structure, the connecting shaft 321 (the handle 3B) is pivotable relative to the first connecting part 26 (the tool body 2B) around the axis of the connecting shaft 321, which serves as the pivot axis A3. Further, the handle 3B is movable relative to the first connecting part 26 (the tool body 2B) in the direction intersecting the pivot axis A3 and also in the extension direction of the pivot axis A3 (i.e., in the left-right direction) in response to the elastic deformation of the elastic members 41.

Further, as shown in FIGS. 9 to 11, in this embodiment, a biasing spring 44 pivotally biases the tool body 2B and the handle 3B such that the grip part 33 and the tool body 2B move away from each other. In this embodiment, the biasing spring 44 is not a compression coil spring but a torsion coil spring.

A coil part 440 of the biasing spring 44 is disposed (mounted, fitted) around the right disc part 251 of the first connecting part 26 (i.e., the rear end portion of the extending part 25). An engagement part 255 protrudes upward from an upper rear end portion of the extending part 25 (in front of the disc part 251). A first end portion 441 of the biasing spring 44 is engaged in an engagement groove formed on the engagement part 255. Further, a contact part 315 is disposed on the rear wall part of the cover part 31 of the handle 3B (specifically, the right member 302). A second end portion 442 of the biasing spring 44 abuts on a front surface of the contact part 315.

Figure 12:
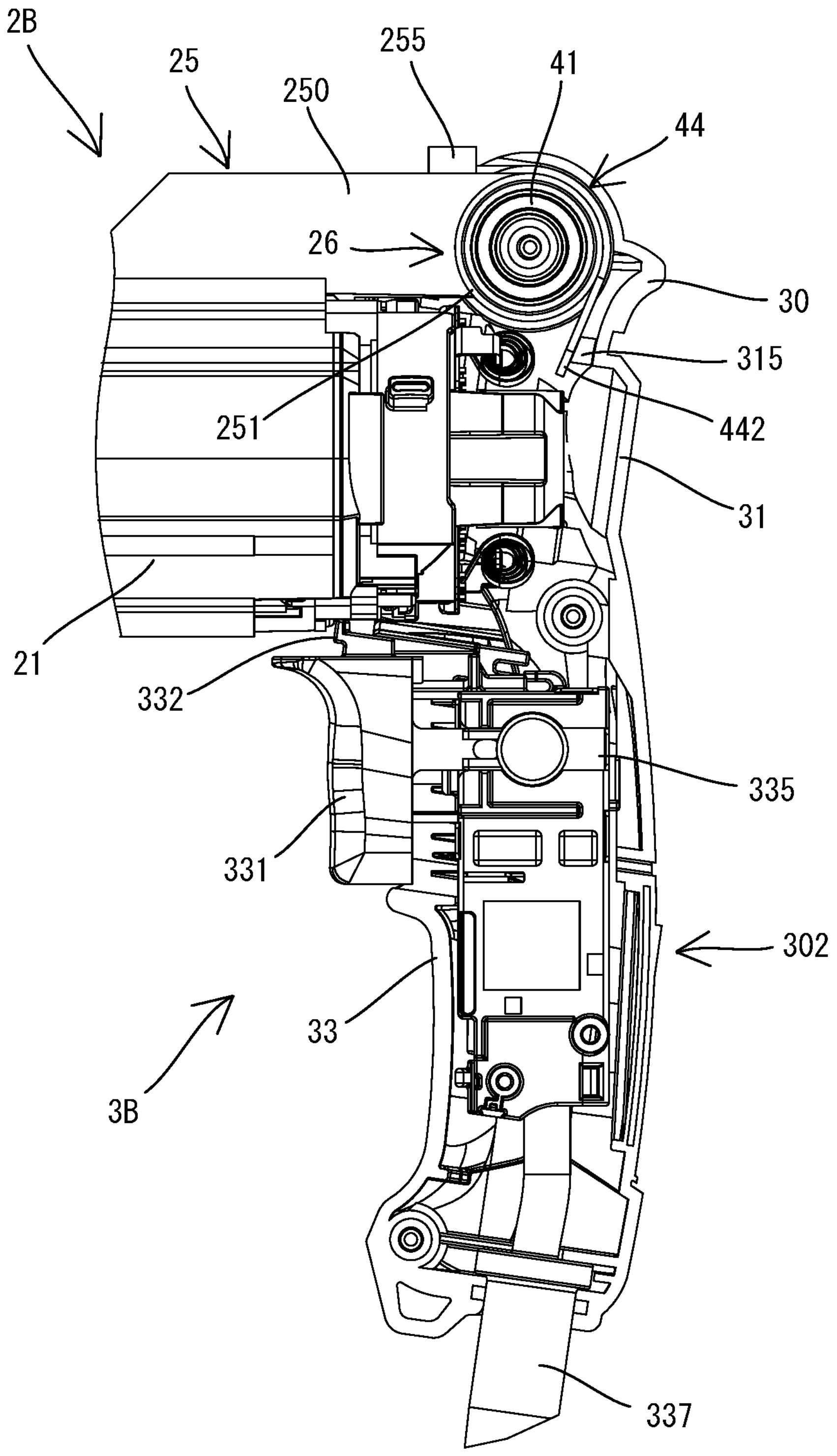
FIG. 12 is a partial left side view of the rotary hammer in a state in which the left member of the handle is removed and the handle is at (in) a forward position.

The biasing spring (the torsion coil spring) 44 pivotally biases the handle 3B relative to the tool body 2B in a first direction (in a counterclockwise direction in FIG. 9) in a state in which the first end portion 441 is engaged with the engagement part 255 and the second end portion 442 abuts on the contact part 315. In an initial state, the handle 3B is held by the biasing force of the biasing spring 44 in an initial position (a position shown in FIG. 9) where stoppers (not shown) that are respectively disposed on the tool body 2B and the handle 3B abut on each other. As shown in FIG. 12, when an external force is applied, the handle 3B is pivoted in a second direction, which is opposite to the first direction, relative to the tool body 2B while deforming the biasing spring 44 (against the biasing force of the biasing spring 44), to a position where the stopper 332 abuts on the lower end portion of the tool body 2B (hereinafter referred to as a forward position).

The actions of the tool body 2B and the handle 3B in this embodiment during the hammering operation are substantially the same as those of the tool body 2A and the handle 3A in the first embodiment. Thus, also in this embodiment, transmission of vibration from the tool body 2B to the handle 3B can be effectively reduced as described above.

Further, in this embodiment, the biasing spring 44 is a torsion coil spring and is disposed around the pivot axis A3 (the disc part 251). This configuration, with the engagement part 255 and the contact part 315 additionally provided on the tool body 2B and the handle 3B, respectively, can appropriately pivotally bias the tool body 2B and the handle 3B. In this manner, this embodiment provides a relatively simple and compact structure for holding the biasing spring 44. Further, the configuration of this embodiment facilitates mounting the biasing spring 44 on (in) the tool body 2B and the handle 3B.

Correspondences between the features of the above-described embodiments and the features of the present disclosure are as follows. However, the features of the embodiments are merely exemplary, and do not limit the features of the present disclosure or the present invention.

Each of the rotary hammers 1A and 1B is an example of a "power tool having a hammer mechanism". The driving axis A1 is an example of a "driving axis". Each of the tool bodies 2A and 2B is an example of a "tool body". The motor 71 is an example of a "motor". The motor shaft 711 is an example of a "motor shaft". The rotational axis A2 is an example of an "axis of the motor shaft". Each of the handles 3A and 3B is an example of a "handle". The upper end portion 30 of each of the handles 3A and 3B is an example of a "first end portion". The pivot axis A3 is an example of a "pivot axis". The grip part 33 is an example of a "grip part". The biasing spring 43 is an example of a "biasing member" and also an example of a "spring". The biasing spring 44 is another example of the "biasing member". The biasing spring 44 is also another example of the "spring" and an example of a "torsion spring". Each of the elastic members 41 is an example of an "elastic member". The left member 301 and the right member 302 of each of the handles 3A and 3B are examples of a "first member" and a "second member", respectively.

The above-described embodiments are merely exemplary embodiments of the disclosure, and the power tool having the hammer mechanism according to the present disclosure is not limited to the rotary hammers 1A and 1B of the above-described embodiments. For example, the following non-limiting modifications may be made. Further, at least one of these modifications may be employed in combination with at least one of the rotary hammers 1A and 1B of the above-described embodiments and the claimed features.

In the above-described embodiments, the rotary hammers 1A and 1B are each exemplarily described as a power tool having a hammer mechanism. The feature(s) of the present disclosure may, however, be applied to other power tools that is capable of performing the hammering operation (for example, an electric hammer (also called a scraper or a demolition hammer) that performs only the hammering operation without performing the rotary operation). Further, the rotary hammer(s) 1A and/or 1B may have only two action modes of: (i) the hammer mode; and (ii) the rotary mode. The structures and arrangements of the motor 71 and the driving mechanism 75 may be appropriately changed, depending on the power tool to which the features of the present disclosure are applied.

The structure for connecting the tool body 2A (2B) and the handle 3A (3B) may be appropriately changed. For example, in a modification, instead of the first connecting part 26 and the second connecting part 32 described above, two shafts may protrude leftward and rightward from the rear end portion of the tool body 2A (2B). Correspondingly, two recesses may be formed on the left wall part and the right wall part of the upper end portion 30 of the handle 3A (3B). Further, the annular elastic members 41 are respectively fitted into the recesses and the shafts of the tool body 2A (2B) may be supported by the elastic members 41. In another modification, instead of the annular elastic members 41, a plurality of elastic members may be respectively disposed at multiple positions around the connecting shaft 321. The rear end portion of the tool body 2A (2B) and the upper end portion 30 of the handle 3A (3B) may be connected via a single elastic member so as to be pivotable relative to each other around the pivot axis A3 and to be movable relative to each other in at least one direction among the front-rear direction, the up-down direction and the left-right direction. The elastic members 41 and the elastic members in the above-described modifications are not limited to silicone rubber. For example, other kind of rubber, any kinds of elastically deformable synthetic resin (polymeric material), and any kind of spring may be employed.

Further, the rear end portion of the tool body 2A (2B) and the upper end portion 30 of the handle 3A (3B) need not necessarily be connected via the elastic member(s). Specifically, the rear end portion and the upper end portion 30 may be connected directly to be pivotable relative to each other. For example, the connecting shaft 321 may be pivotally supported in a state in which its outer peripheral surface is in contact with the surface that defines the support hole 260. Thus, the position of the pivot axis A3 may be substantially unchangeable.

In the above-described embodiments, each of the handles 3A and 3B is formed by two halves (the left member 301 and the right member 302) connected to each other in the left-right direction. However, the handle 3A (3B) may be formed by connecting two halves that are originally divided, for example, in the front-rear direction. Alternatively, the handle 3A (3B) may be formed by connecting multiple components that are originally divided in other direction. Similarly, the components of each of the tool body 2A and 2B and the connecting structure thereof may be appropriately changed.

The elastic member(s) that pivotally biases the tool body 2A (2B) and the handle 3A (3B) such that the grip part 33 and the tool body 2A (2B) move away from each other is not limited to the biasing spring(s) 43 (44). For example, instead of the biasing spring 43 (44), a flat spring, a spiral spring, a disc spring, etc. may be employed. Alternatively, an elastic member other than a spring, e.g., rubber and synthetic resin (polymeric material) may be employed. Further, the number and the positions of the biasing springs 43 (44) are not limited to those in the above-described embodiments. For example, only one biasing spring 43 may be disposed on (along) the plane P in the first embodiment. Alternatively, three or more of the biasing springs 43 may be disposed. Two biasing springs 44 may be disposed around the left and right disc parts 251 in the second embodiment. Further, the structure of a spring receiving part that receives an end of a biasing spring may be appropriately changed based on the kind and position of the spring to be employed.

Each of the rotary hammers 1A and 1B may be driven by electric power supplied from not an external power source but from a rechargeable battery (a battery pack). In such a modification, for example, a battery mounting part, which is configured to removably receive a battery, is provided on (in) the lower end portion (the free end portion) of the handle 3A (3B).

Further, in view of the nature of the present disclosure, the following Aspects can be provided. Any one of the following Aspects can be employed in combination with at least one of the rotary hammers 1A and 1B of the above-described embodiments, the above-described modifications and the claimed features.

(Aspect 1)

An extension direction of the driving axis defines a front-rear direction of the power tool, a direction that is orthogonal to the driving axis and to the axis of the motor shaft defines an up-down direction of the power tool, and the first end portion is an upper end portion of the handle and is connected to a rear end portion of the tool body to be pivotable around the pivot axis.

(Aspect 2)

The grip part is located below the tool body in the up-down direction.

(Aspect 3)

The pivot axis extends substantially in the left-right direction that is orthogonal to the front-rear direction and the up-down direction.

(Aspect 4)

An upper end portion of the grip part has a manipulation member that is configured to be manually depressed by a user.

The trigger 331 of the above-described embodiments is an example of a "manipulation member" of this Aspect.

(Aspect 5)

The upper end portion of the grip part is on a straight line that intersects the pivot axis and that extends in the up-down direction.

(Aspect 6)

The at least one elastic member is configured to permit the tool body and the handle to move relative to each other at least in an extension direction of the pivot axis.

(Aspect 7)

The elastic member has an annular shape (is an elastic ring).

(Aspect 8)

A first one of the tool body and the first end portion of the handle has a shaft, and the at least one elastic member is disposed around the shaft and is disposed (interposed) between the shaft and a second one of the tool body and the first end portion of the handle.

The connecting shaft 321 of the above-described embodiments is an example of a "shaft" of this Aspect.

(Aspect 9)

The spring is a compression coil spring that extends along its axial line and is arranged such that the axial line substantially coincides with the extension direction of the tangent.

DESCRIPTION OF THE REFERENCE NUMERALS

1A, 1B: rotary hammer, 2A, 2B: tool body, 21: motor housing part, 23: driving-mechanism housing part, 25: extending part, 250: plate part, 251: disc part, 255: engagement part, 26: first connecting part, 260: support hole, 261: recess, 28: first spring holding part, 281: spring receiving part, 282: contact surface, 283: end surface, 285: spring guide, 3A, 3B: handle, 301: left member, 302: right member, 30: upper end portion, 31: cover part, 315: contact part, 32: second connecting part, 321: connecting shaft, 33: grip part, 331: trigger, 332: stopper, 335: switch, 337: power cord, 37: second spring holding part, 370: opening, 371: spring receiving part, 373: contact surface, 374: engagement piece, 376: stopper, 377: stopper surface, 378: restricting part, 41: elastic member, 43: biasing spring, 431: first end portion, 432: second end portion, 44: biasing spring, 440: coil part, 441: first end portion, 442: second end portion, 71: motor, 711: motor shaft, 75: driving mechanism, 79: tool holder, 91: tool accessory, A1: driving axis, A2: rotational axis, A3: pivot axis

What is claimed is:

1. A power tool having a hammer mechanism configured to linearly drive a tool accessory along a driving axis, the power tool comprising:

a tool body defining the driving axis;

a motor housed in the tool body and including a motor shaft, the motor shaft being rotatable around a motor shaft axis that is parallel to the driving axis;

an elongate handle (a) connected to the tool body in a cantilever manner and extending in a direction intersecting the driving axis and (b) including (i) a first end portion connected to the tool body to be pivotable about a pivot axis relative to the tool body, (ii) a free end and (iii) a grip part between the first end portion and the free end and configured to be gripped by a user;

at least one torsion coil spring (i) operatively between the tool body and the handle, (ii) configured to pivotally bias the tool body and the handle such that the free end and the grip part are biased away from the tool body and (iii) including (a) a cylindrical coil part having a longitudinal center axis that is co-axial with the pivot axis and around a shaft that extends along the pivot axis, (b) a first end that applies a first force on the tool body and (c) a second end that applies a second force on the handle that is opposite the first force; and at least one elastic ring that (i) is around the pivot axis and (ii) is between the tool body and the first end portion such that the tool body and the handle are movable relative to each other in a direction intersecting the pivot axis, wherein the at least one torsion coil spring and the shaft are covered by the tool body and/or the handle;

one of a group consisting of (i) the tool body and (ii) the first end portion includes the shaft extending along the pivot axis;

another of the group consisting of (i) the tool body and (ii) the first end portion includes a tubular part around the shaft;

the at least one elastic ring is between the shaft and the tubular part in a radial direction of the shaft; and the coil part of the torsion coil spring is around the tubular part.

2. The power tool as defined in claim 1, wherein the driving axis is between the pivot axis and the grip part in an extension direction of the handle.

3. The power tool as defined in claim 2, wherein at least a portion of the grip part is on a straight line that (i) intersects the pivot axis and (ii) is orthogonal to the driving axis.

4. The power tool as defined in claim 3, wherein the tool body and the handle are connected via at least one elastic member that is around the pivot axis and between the tool body and the first end portion of the handle such that the tool body and the handle are movable relative to each other in a direction intersecting the pivot axis.

5. The power tool as defined in claim 4, wherein:

one of a group consisting of (i) the tool body and (ii) the first end portion of the handle has a shaft, and the at least one elastic member is around the shaft and between the shaft and another of the group consisting of (i) the tool body and (ii) the first end portion of the handle.

6. The power tool as defined in claim 5, wherein the at least one elastic member is at least one elastic ring that is around the shaft.

7. The power tool as defined in claim 6, wherein the at least one elastic ring is between the tool body and the handle along the pivot axis.

8. The power tool as defined in claim 7, wherein:

the handle includes a first member and a second member connected to each other along the pivot axis, and the at least one elastic ring includes a first elastic ring between the tool body and the first member and a second elastic ring between the tool body and the second member.

9. The power tool as defined in claim 1, wherein the tool body and the handle are configured such that a position of the pivot axis is changeable.

10. The power tool as defined in claim 9, wherein the tool body and the handle are connected via at least one elastic member that is around the pivot axis and between the tool body and the first end portion of the handle such that the tool body and the handle are movable relative to each other in a direction intersecting the pivot axis.

11. The power tool as defined in claim 10, wherein the tool body and the handle are connected via the at least one elastic member such that the tool body and the handle are movable relative to each other along the pivot axis.

12. The power tool as defined in claim 10, wherein:

the handle includes a first member and a second member connected to each other along the pivot axis, and the at least one elastic member includes a first elastic member between the tool body and the first member and a second elastic member between the tool body and the second member.

* * * * *